United States Patent
Chow et al.

[11] 3,720,945
[45] March 13, 1973

[54] RECEIVER DEVICE

[75] Inventors: Henry Chow, Detroit; William R. Faris, Berkeley; Howard F. Lynn, Livonia; Delmar V. Payne, Ferndale, all of Mich.

[73] Assignee: The Bendix Corporation, Southfield, Mich.

[22] Filed: Aug. 19, 1965

[21] Appl. No.: 481,450

Related U.S. Application Data

[63] Continuation of Ser. No. 118,195, June 19, 1961, abandoned.

[52] U.S. Cl. ............343/114.5, 343/16 R, 343/113 R
[51] Int. Cl. .................................................G01s 5/02
[58] Field of Search ..343/100.3, 100 ST, 114.5, 119, 343/113, 5 GC, 16.1, 123, 117.1; 328/145; 325/326, 362, 411, 413, 415; 244/77 M, 77 V, 77 SE, 14

[56] References Cited

UNITED STATES PATENTS

| | | | |
|---|---|---|---|
| 2,577,506 | 12/1951 | Belleville | 328/145 |
| 3,032,755 | 5/1962 | Snyder | 343/5 |
| 3,060,381 | 10/1962 | Turner et al. | 325/415 X |
| 3,137,853 | 6/1964 | Cutler | 343/100 |
| 3,218,642 | 11/1965 | Newhouse et al. | 343/114.5 |
| 2,931,032 | 3/1960 | Newhouse | 343/119 |
| 3,050,729 | 8/1962 | Fromm | 343/119 |
| 2,577,506 | 12/1951 | Belleville | 328/145 |
| 2,879,385 | 3/1959 | Luftig | 328/145 |

FOREIGN PATENTS OR APPLICATIONS

812,638 4/1959 Great Britain............................340/3

*Primary Examiner*—Benjamin A. Borchelt
*Assistant Examiner*—G. E. Montone
*Attorney*—Vett Parsigian, Richard T. Seeger and Plante, Arens, Hartz & O'Brien

EXEMPLARY CLAIM

1. Apparatus for receiving signals comprising
   first locating means for locating a signal direction along one axis,
   second locating means for locating said signal direction along a second axis,
   said locating means each comprising receiving means connected to amplifying means,
   attenuating means to attenuate the signals to said amplifying means in proportion to the signals from said amplifying means thereby increasing the range of said amplifying means,
   display means for receiving said signals from said locating means and displaying the source corresponding to said signal,
   the received signal being pulsed,
   a leading edge gate generator means,
   said leading edge gate generator means being between each of said locating means and said display means for sending only the leading edge of the pulse to the display means, thereby minimizing the undesirable effects of reflections of the source of radiation from surrounding objects.

8 Claims, 12 Drawing Figures

FIG. 1

INVENTORS
HOWARD F. LYNN
HENRY CHOW
WILLIAM R. FARIS
DELMAR V. PAYNE

ATTORNEY

INVENTORS
HOWARD F. LYNN
HENRY CHOW
WILLIAM R. FARIS
DELMAR V. PAYNE

BY
*Richard T. Seger*
ATTORNEY

FIG. 10

RECEIVER DEVICE

This is a continuation of our copending application Ser. No. 118,195 filed June 19, 1961 entitled "Receiver Device." now abandoned.

This invention pertains to a receiver system which visually represents on a display means the relative position of electromagnetic radiation sources such as radio-frequency generators. More particularly, this invention pertains to improvements of a receiving system adapted for placement in a vehicle.

In these type receivers, the signals from the first pair of antennas are compared and then sent to a first set of deflection plates of a cathode ray tube or other display device, and the signals from the second pair of antennas are compared and sent to a second set of deflection plates of the cathode ray tube. The signal from each pair or set of antennas determines the position of a spot on the cathode ray tube screen thereby indicating the position of the source of radiation.

However, as the radiation sources re approached, the signals become stronger and the differences become larger. In previous systems, this would cause an error in the indication of the position of the sources on the display means. This invention overcomes this problem by using antenna patterns and detectors related so that the plot of the difference between the logarithms of the two signals for each antenna set versus the angle of the received signal is linear. Logarithmic amplifiers are then used to amplify the detected signals which had been received by the antennas and when the difference between the two logarithmic signals of each set of antennas is taken, a linear ratio is obtained which is used to position the representation of the angular position of the radio-frequency generator or sources on the display means. Regardless of how near or far the radiated source is, the difference between the logarithms of the signals will always be the same because this is essentially a ratio between the two signals, and therefore minimum error due to absolute amplitude variations of the sources is introduced.

It is therefore an object of this invention to provide a receiver which has a pair of antennas aligned along one axis for positioning the representation of a radiated source along that axis and a second pair of antennas along a second orthogonal axis for positioning the representation of the radiated source along that axis, the improvement wherein the antennas have patterns such that when detected the plot of the difference of logarithms of the detector outputs versus the received signal direction is linear; and logarithmic amplifiers to amplify the signals from each antenna, and difference means to subtract amplified signals resulting in a linear ratio so that errors due to varying distances between the sources or changes in absolute power level of the sources and receiver are minimized.

Further, in the above type receiver, errors might be introduced due to reflections of the radiated source signal from the ground or other objects which would be received by the receiver and presented on the display means resulting in a false source indication. This invention minimizes this problem by taking only the leading edge of a received pulsed signal to indicate on the display means the radiated sources. By restricting the measurements to the leading edge of an incoming pulse, the reflections which arrive after the leading edge are not used and therefore false information and indication in the display means is minimized.

It is therefore an object of this invention to provide in the above-mentioned receiver, a leading edge gate which uses only the leading edge of an incoming pulse so that signal distortion and irregularities due to reflection are minimized.

It is a further object of this invention to utilize in such a receiver system, logarithmic-period antennas which may be substantially flush mounted to a vehicle surface to provide maximum streamlining effects, and also provide a wide frequency band and wide look angle for receiving radiations.

These and other objects will become more apparent when a preferred embodiment of this invention is described in connection with the drawings in which.

ANTENNA AND RECEIVER

Figure 1:
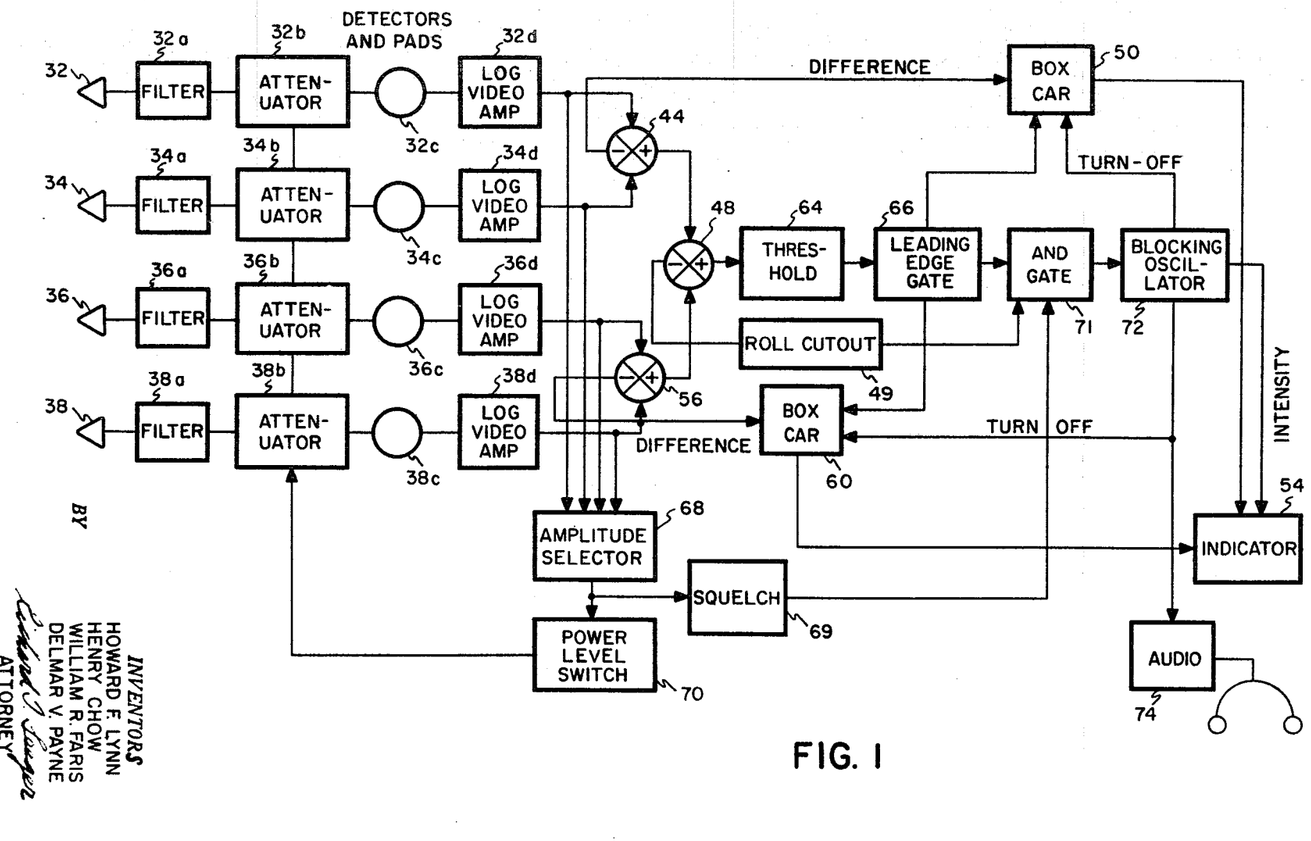
FIG. 1 is a simplified block diagram of a preferred embodiment of this invention.

The antenna system and receiver used, which may be placed in an airborne vehicle for receiving and presenting the continuous picture to the vehicle the position of radiation sources, emitting radio-frequency, will now be described will the aid of the schematic shown in FIG. 1 and with the diagrams of FIGS. 2–8. Located in a first alignment on the airplane are a first pair of complementary antennas 32, 34 which are, in this embodiment, divergent so that their lobes appear as in FIG. 5. The purpose of the two antennas 32 and 34, which are aligned along an axis, is to receive radio signals and then send these signals to means, which will be later described, for locating the source position along that axis.

Also, located in the vehicle in a second alignment preferably orthogonal to the first alignment and similarly divergent, is a second pair of complementary antennas 36, 38 which are connected to means, also later described, for determining the source positions along the axis of the second alignment.

Figure 6:
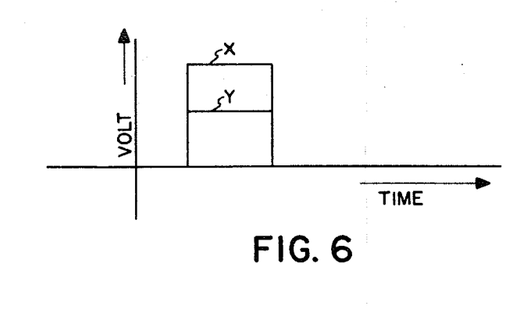
FIG. 6 shows the relative outputs from a signal intercepting the lobes as shown in FIG. 5.

Assume for the moment that lobe 32a (FIG. 5) is the lobe for antenna 32 and lobe 34a is the lobe for antenna 34. As mentioned, these lobes are directed outwardly at a divergent angle so that if a signal should be received at an angle such as signal 40, it will intercept lobe 32a at point X and intercept lobe 34a at point Y, giving corresponding levels at voltages as shown in FIG. 6. By knowing the antenna patterns for each antenna, and assuming the antennas are aligned along a horizontal axis, these voltages can be compared to determine horizontal component of angle the received signal 40 makes with the center line 42. In a similar manner, antennas 36 and 38 have characteristic lobes and assuming they are aligned along a vertical axis, a signal which is received can be vertically located by comparing the voltages which are picked up simultaneously by the antennas.

Figure 2:
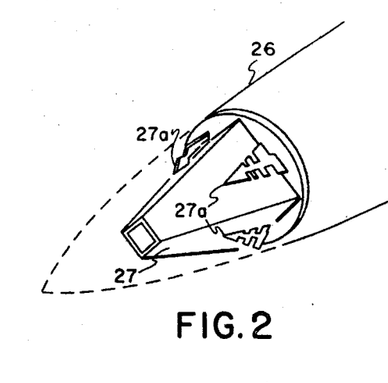
FIG. 2 is a partial perspective view of the antenna as it might be mounted on an airplane.
Figure 3:
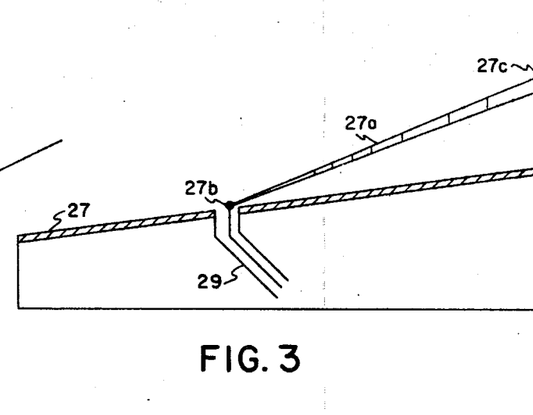
FIG. 3 is a partial sectioned view of an antenna mounted to a pyramid side.

A particular antenna structure that gives satisfactory results is shown mounted to an aircraft nose in FIG. 2. Aircraft 26 has mounted in a forward position a truncated square pyramid 27 having four logarithmic periodic antennas 27a, which would correspond to antennas 32 – 38, mounted on its sides. There are two sets of complementary antennas, with antennas on opposite sides of the pyramid 27 forming a set. Each antenna 27a is connected to the center conductor of a coaxial line 29 which extends through a pyramid side, FIG. 3, and is angled away from the pyramid side so that each antenna base 27c is spaced from the pyramid side. In this manner, the pyramid sides act as ground planes and antenna patterns such as those shown in FIG. 4 are possible.

Figure 4:
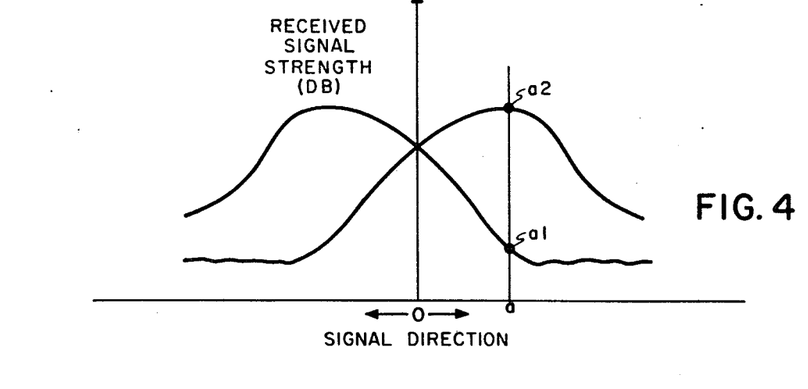
FIG. 4 is a rectangular coordinate plot of an antenna pattern for logarithmic periodic antennas.
Figure 5:
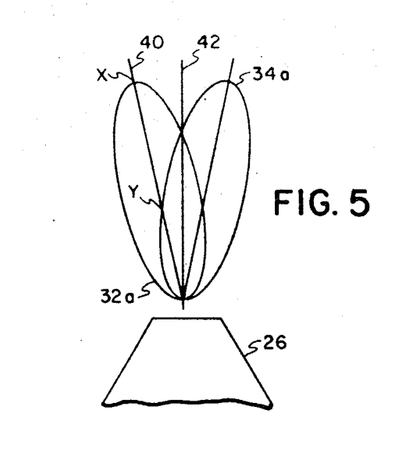
FIG. 5 is a diagrammatic view of the antenna lobes aligned in one measurement plane.

In FIG. 4, two patterns for complementary antennas 27a are shown with Received Signal Strength in decibels plotted along the ordinate and Signal Direction plotted along the abscissa. The curves intersect along the zero angle direction indicating that the signal strengths are equal at that point. At a signal direction $\alpha$ the curves are intersected at points $\alpha_1$ and $\alpha_2$ respectively and such direction would have a distinctive set of curve intercepts which can be processed to indicate the signal direction as explained below. The logarithmic periodic antenna known to the art and described in 1957 IRE Convention Record, Part 1, pp. 119 to 128 "Broadband Logarithmically Periodic Antenna Structure" by R. H. DuHamel and D. R. Isbell. This antenna has small side lobes and therefore, is not ambiguous in that a signal intercepting one of the side lobes would not be mistaken for a signal intercepting the operating range of the antenna since any side lobe signal would be substantially smaller.

Each antenna, 32, 34, 36 and 38, is connected to a filter 32a – 38a which pass only those frequency ranges that are desired for a particular application. The signals are then passed through attenuators 32b – 38b which are varied when received signal strengths reach a predetermined level, in a manner described subsequently. Detectors 32c – 38c are connected between the attenuators 32b – 38b and logarithm video frequency amplifiers 32d – 38d. The characteristics of the detectors are important and must be matched with the antenna patterns and amplifier characteristics to provide a linear-logarithmic output at each amplifier output. In this embodiment, the detectors are of the crystal-video type with approximate square law characteristics at low signal level changing to linear detector characteristics at high signal level. The radio frequency portion of the received signal is filtered out by a low pass filter of the crystal construction.

The logarithm amplifiers 32d –38d receive the signals from the detectors and convert them to a voltage which corresponds to a logarithm value which when differenced with a logarithm value of the signal in the other antenna with which it is aligned, will determine accurately the position of a radio-frequency source signal along the axis of the antenna pair. This difference will be in linear relation to the received signal deviation from system boresight.

The two antennas of each pair of complementary antennas send to their respective crystal detectors a pair of signals the magnitude of which varies depending on where the received pulse of energy intercepts the patterns. The ratio of one signal to the other varies exponentially according to the direction of the received signal. The crystal detectors and logarithmic amplifiers take the logarithm of this signal and the result is a logarithmic signal which varies in linear relation to the received signal.

This can be seen more clearly by equation representation: Let:

$E_1$ = Voltage of one antenna in a pair of complementary antennas, such as antenna pair 32, 34 or pair 36, 38

$E_2$ = Voltage of the other antenna in the pair $\epsilon$ and $k$ = constants $\theta$ = angle of arrival of the received radiation the antennas have patterns such that:

$$E_1/E_2 = \epsilon^{k\theta} \tag{1}$$

the log amplifiers take the $\log_\epsilon$ of the above system, $$\log_\epsilon (E_1/E_2) = \log_\epsilon \epsilon^{k\theta} \tag{2}$$

which is equivalent to:

$$\log_\epsilon E_1 - \log_\epsilon E_2 = k\theta \tag{3}$$

so that by subtracting two quantities, $\log_\epsilon E_1$ and $\log_\epsilon E_2$ a signal is produced which varies linearly with received signal direction, $\theta$, and is independent of signal level since a ratio, $\log_\epsilon (E_1/E_2)$, is being taken. Although the relationships between the antenna, crystal detectors, and amplifiers are not exactly as represented by these equations, the principle is well illustrated by the use of the equations.

Figure 9:
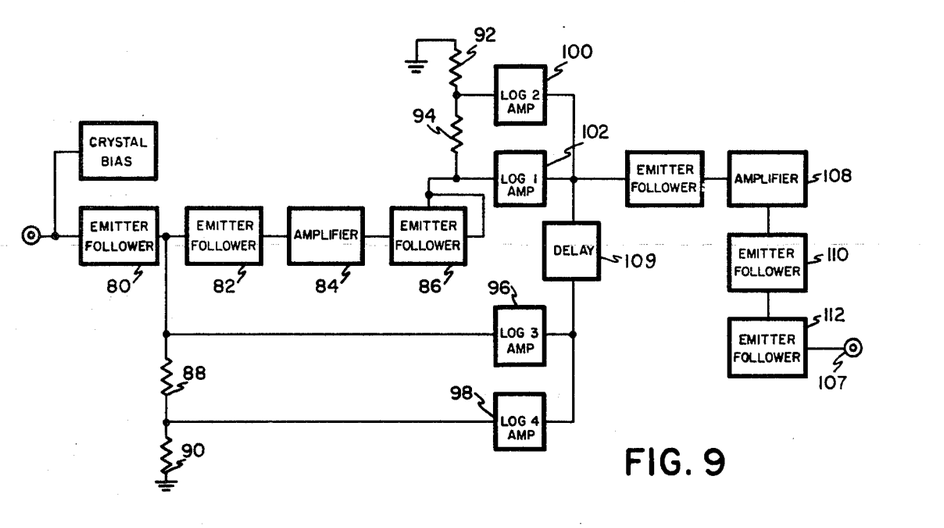
FIG. 9 is a block diagram of each logarithmic amplifier.
Figure 10:
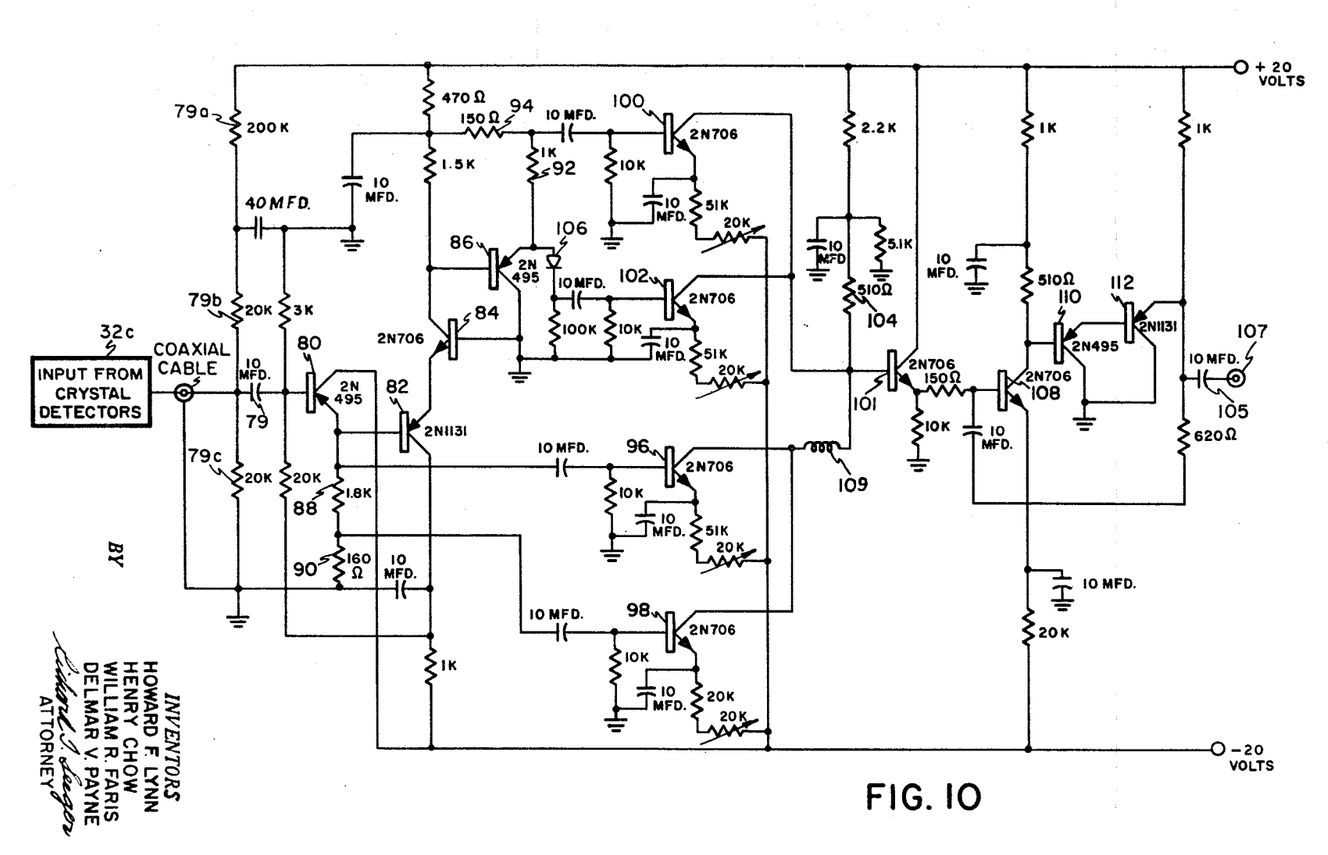
FIG. 10 is a circuit diagram of each logarithmic amplifier.

Signals from each of the logarithmic periodic antenna elements 32 – 38 are crystal detected and amplified by logarithmic video amplifiers 32d – 38d for use by the system. The transfer characteristic of each amplifier obtains a voltage analog of the logarithm of the amplitude of the signal input to the crystal detector. A block diagram of a single logarithmic video amplifier is shown in FIG. 9 and a schematic diagram is shown in FIG. 10. The following explanation of amplifier operation will be made with reference to these two figures.

Signals from each crystal detector, in this case detector 32c, are coupled to the input of emitter follower 80 by capacitor 79 and resistors 79a, 79b and 79c in order to preserve the crystal bias current, 90 microamperes. The first emitter follower 80 drives a second emitter follower 82 which in turn drives a grounded base amplifier 84. The grounded base amplifier 84 is decoupled from its load by a third emitter follower 86. The signal at the emitter of the first emitter follower 80 is divided by resistors 88, 90 and the signal at the emitter of the third emitter follower 86 is divided by means of resistors 92, 94 to obtain four output signals of the same polarity and with the signals attenuated in the ratio of approximately 1:10:100:1000. Transistors 102, 100, 96, 98 are all operated in their logarithmic ranges and due to the fact that signals are attenuated to these resistors in the ratio of 1:10:100:1000, respectively, a wide amplitude range of input signals can be amplified logarithmically.

The attenuation ratios would not be exactly as stated because the input networks to the logarithm taking transistors would not be identical and because the detection characteristic of the crystal changes from square law to linear in the region of $-12$ dbm in signal strength, and this transition is adjusted for by adjusting resistors 88, 90, 92 and 94.

The signals from the four tap points of resistors 88, 90, 92 and 94 are applied to the bases of four log-taking transistors 96, 98, 100, 102 respectively and the outputs of transistors 96, 98, 100 and 102 are summed in the resistor 104 which is common to the collectors of these transistors. These four log-taking transistors are operated at a low emitter current level where the transfer characteristics are nonlinear. When the operation of transistor 102 is in the "level off" region in which substantially the same output exists for any input, transistor 100 takes over and operates in its logarithmic range until it is in its "level off" region, after which transistor 96 takes over etc.

Figures 10A, 11:
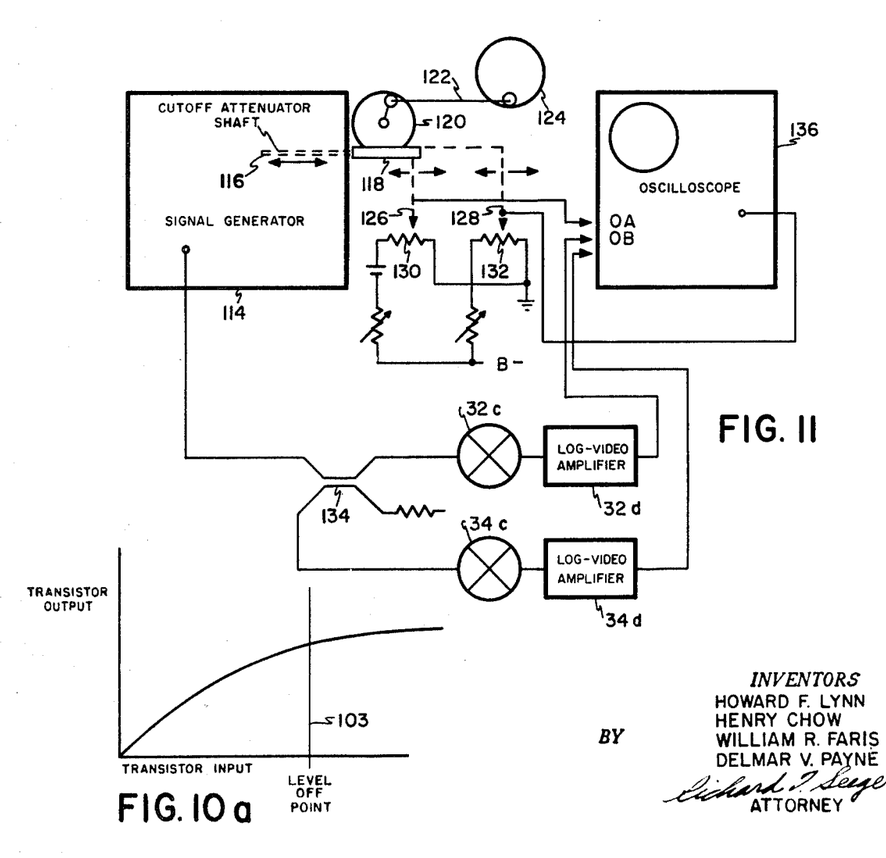
FIG. 10a is a plot of signal-in and signal-out of amplifying element in a logarithmic amplifier.
FIG. 11 is a schematic block diagram of a circuit used to align the amplifiers of this invention.

In FIG. 10a, where the output of a typical log-taking transistor is plotted against the input, the curve is logarithmic to the "level off" point 103. Essentially no signal is emitted from the transistor output after this point because the amplifier output is coupled by capacitor 105 to the output coaxial cable 107, and will not pass d-c signals. Input pulses before the level off point 103 are passed because they have a predetermined rise time which in the pre-level off portion results in a corresponding rise time that the capacitor 105 will pass.

At high signal levels, the base-emitter junction of the first log-taking transistor 102, which contributes the major portion of collector current changes at low signal levels, would be damaged except for the presence of a diode 106 in series with the base of this transistor. The diode 106 limits the current to the base of transistor 102 since the diode output levels off after input reaches a predetermined point.

A difficulty brought about by a time delay of approximately 20 millimicroseconds existing between signals from log-taking transistors 100 and 102 and log-taking transistors 96 and 98 as a result of the addition of three more transistors in the signal path to the first pair, was corrected by the addition of a $\pi$ section delay network 109 between the collectors of the second pair of log-taking transistors and the common collector summing resistor 104 to which the first pair are directly connected. Also, since the detection characteristic of crystal 32c changes from square law to linear as the crystal output increases, the quiescent current of log-taking transistor 98 as well as the base drive signal ratios at the bases of log-taking transistors 96 and 98 must be modified in order to realize the desired over-all transfer characteristic. Emitter follower 101 is to be used to unload resistor 104 from the circuit to the right thereof.

After summing the currents from the four log-taking transistors, the signal is amplified by amplifier 108 and inverted to provide a large pulse (0.5 to 2.5 volts in this embodiment) compatible with the requirements of the system. The cable which transmits the pulse to the system is matched to the amplifier 108 by a cascaded emitter follower pair 110 and 112.

The alignment of the logarithmic video amplifiers is accomplished with the aid of a swept amplitude signal generator, (FIG. 11). A Hewlett-Packard model 616A UHF Signal Generator 114 has a cutoff attenuator shaft 116 which is connected to rack 118 which is engaged with and reciprocated by oscillating pinion 120.

A cutoff attenuator is a coaxial transmission line which has the center conductor severed and with the ends movable toward and away from one another to attenuate the signal in an exponential manner. This is more fully set forth in Techniques of Microwave Measurements, Montgomery Vol. 11 of Radiation Laboratory Series, McGraw-Hill, P. 685 et seq.

Pinion 120 is oscillated by crank 122 which is pivoted to a point on the circumference of motor driven disc 124. Amplitude of the signal from generator 114 is controlled according to the position of cutoff attenuator 116.

The pointers 126, 128 of two precision linear potentiometers 130, 132 are attached to the rack 118 and reciprocate along the potentiometers 130, 132 respectively. The voltage from the first potentiometer 130 is a reference voltage and varies in a linear relation to the position of rack 118 and is compared with the amplifier output as described below, and the voltage from the second potentiometer 132 provides horizontal deflection voltage for an oscilloscope 136 display. Signals to be compared are plugged into inputs A & B.

Input signals to the crystal detectors 31c, 34c and corresponding log video amplifiers 32d and 34d which are to be aligned, are obtained by dividing the power from the signal generator 114 using a 3 decibel broadband directional coupler 134. In this fashion two equal, swept amplitude signals are available. The signals can be made unequal by inserting a fixed amount of the desired attenuation in one arm of the directional coupler.

Amplifier alignment of each amplifier is accomplished by comparing on oscilloscope 136 the output of a logarithmic video amplifier which is being aligned and the output of the reference potentiometer 130. A log video amplifier is properly adjusted and matched to the crystal detector when the difference between the amplifier output and the first potentiometers 130 voltage is zero or very small. The second potentiometer 132 output as mentioned, provides the horizontal deflection or sweep voltage. Therefore, the voltage level at which any discrepancy between the amplifier output and the reference output takes place can easily be seen by noting at which horizontal position it takes place.

When both amplifiers have been compared with the reference potentiometer 132, they may be compared to each other by adjusting until the difference between the two amplifier output signals is minimized as the input signal power is swept periodically.

After the amplifiers 32d – 34d have processed the signals supplied them, the signals are fed to a sum and difference device 44, which takes the difference of the two logarithm signals, which is the quotient of the signals, and feeds this to a boxcar circuit 50. Device 44 also takes the sum of these two signals and feeds this to a second summing device 48. Boxcar circuit 50 is connected to one pair of deflection plates of an indicator 54. The boxcar circuit 50, which is operated by a leading edge gate 66 to receive only the leading edge of a pulse, stores the amplitude of the leading edge of each pulse which is received by it so that an optimum display is presented on the screen (not shown) of indicator 54.

The signals from vertically aligned antennas 36 and 38 are fed from log amplifiers 36d and 38d to a sum and difference device 56, which takes the difference of the two logarithm signals or quotient, and feeds this to a boxcar circuit 60 and the sum to summing device 48. Boxcar circuit 60 performs the same function as circuit 50 and is connected to a second set of deflection plates of indicator 54.

The output of the summing device 48 is connected to a signal presence device or threshold 64, which in turn actuates a leading edge gate pulse generator 66. The threshold device 64 will not pass signals to actuate generator 66, which are below a predetermined minimum so that the very weak signals, such as crystal noise signals, the signals which fall out of the dynamic logarithmic range of the log amplifiers 32c – 38c, will not be passed since gate 66 will not operate boxcars 50, 60.

An amplitude selector device 68 is connected to amplifiers 32d – 38d, and is connected through a squelch circuit 69 to an "and" gate 71 which is connected between the leading edge gate generator 66 and a blocking oscillator 72 which controls the intensity power to indicator 54. Oscillator 72 is also connected to boxcar circuits 50 and 60 to determine the pulse length of signals passing to indicator 54 by resetting the boxcar detector output to zero immediately after display. A power level switch 70 is connected between amplitude selector 68 and each attenuator 32b – 38b. If any antenna receives a signal exceeding a predetermined maximum, then the amplitude selector will send a signal to the switch 70 which will adjust attenuators 32b – 38b to correspondingly increase signal attenuation. If a signal comes in which is so strong that it will be outside the attenuation range and hence, the log range of amplifiers 32c – 38c, squelch circuit 69 will cut off its signal to "and" gate 71 which will, in turn, cut off a signal to blocking oscillator 72 and intensity to indicator 54, thus disabling the system.

If the signal received by signal presence device 64 from summing device 48 exceeds a predetermined minimum, indicating that it is an acceptable source and not a noise signal, and if all of the signals from amplifiers 32d – 38d are less than a predetermined maximum, indicating that signal is within the log range of amplifiers 32d – 38d, the leading edge gate generator 66 is actuated, operating boxcar circuits 50 and 60 so that they detect the leading edge of the pulses from circuits 44 and 56 respectively, to provide signals to deflection plates of indicator 54.

Figure 7:
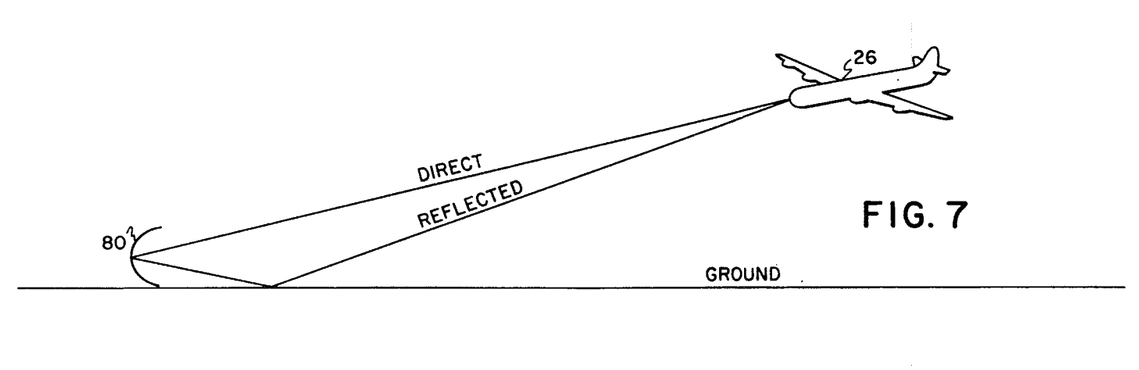
FIG. 7 shows an airplane receiving a radiation directly from a radio-frequency source and a reflected radiation.
Figure 8:
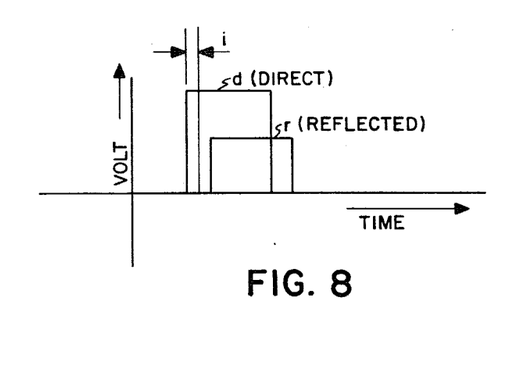
FIG. 8 shows the waveform as received in the airplane from the direct radiation and the reflected radiation.

The manner in which leading edge gate generator 66 minimizes reflected signals from appearing on the display means will now be discussed in connection with FIGS. 7 and 8. Signals from a source, such as source 80, will tend to be reflected off the ground or other objects, as shown in FIG. 7 and therefore, be received by vehicle 26 at a different angle than the direct path signal and give an erroneous signal or signals to the pilot. In order to minimize this, only the leading edge of the pulses radiated by a source is used to establish the display of radio-frequency sources on the cathode ray tube screen. A reflected path signal such as waveform r, would arrive at the vehicle 26 later than the direct path radiation, waveform d, since the reflected path is longer, generator 66 will energize the boxcars 50 and 60 for only a very short interval, as indicated by the letter i in FIG. 8, and the reflected path signal will not be considered in determining the voltages of the cathode ray tube deflection plates 52, 62. Therefore, the reflected path signals will be minimized. The rise time of the pulses going to the leading edge gate should be steep enough so that the full pulse height is obtained before reflections start to interfere.

An audio circuit 74 may be connected to oscillator 72 to indicate aurally to the operator the repetition frequency of signal pulses.

The source may radiate horizontal, vertical or circular polarized signals and if so the antennas would be aligned at 45° to the horizontal in order to receive all these polarizations of signal. Therefore, if the vehicle rolls about its longitudinal axis during a signal reading, signals may come in much stronger on one set of antennas, which is aligned with polarization than in the other set which is not aligned with this polarization. To prevent disability to one of the orthogonal measurement channels during this condition, a connection is made between a difference output of device 48 and "and" gate 71 through roll cutout device 49. If the difference between the inputs to device 48 exceeds a maximum, the "and" gate is controlled by device 49 to prevent a signal from being transmitted to indicator 54.

OPERATION

Briefly, the operation of the receiver in this system is as follows:

A signal is received by antennas 32 – 38 passed through attenuator 32b – 38b, detected by rectifiers 32c – 38c, removing the high frequency carrier portion, and amplified by log amplifiers 32d – 38d. Antennas 32 and 34 may be horizontally aligned, and signals from these two antennas are sent by logarithmic amplifiers 32d and 34d, respectively, to a sum and difference device 44, which delivers the logarithm difference or quotient of the two signals, which is in linear relation to the received signal direction, to boxcar circuit 50 and the log sum to summing device 48. In like manner, the sum and difference of the signals from vertically aligned antennas 36 and 38 are delivered by sum and difference device 56 to summing device 48 and boxcar circuit 60 respectively. The characteristics of amplifiers 32d – 38d must be closely designed or mated to the crystal characteristics of the detectors 32c – 38c and the antenna lobe patterns since the horizontal and vertical position of a signal source is determined by the points at which a signal intercepts the lobe patterns, and the accuracy of the system is determined by the combined characteristics of the antennas, crystals and log amplifiers.

Boxcar circuits 50 and 60 send signals to deflection plates of indicator 54 to display the angular coordinates of the signal source on the screen of indicator 54. In order not to reproduce noise signals, which are of lower amplitude than the source signals, devices 44 and 56 also send signals to a sum and difference device 48 which sends the sum of the two signals to a signal presence or threshold device 64 which allows a signal to pass to leading edge gate generator 66 only if their sum is above a predetermined minimum.

Also, to attenuate or prevent very strong signals, which would be outside the log range of amplifiers 32d – 38d, the signals are passed to amplitude selector 68 which sends a signal to switch 70 which acts to operate attenuators 32b – 38b to attenuate the signals until they fall in the range of the logarithmic amplifiers.

If a signal greater than a predetermined maximum is received by any antenna, this signal will pass through the device 68 which will then operate squelch circuit 69 to squelch the signals.

Threshold device 64 sends its signal to a leading edge gate generator 66. Leading edge gate 66 operates boxcar circuits 50 and 60 for a very short period so that only the amplitude near the leading edges of the difference pulses are allowed to pass to deflection means of indicator 54. This prevents ground reflections which arrive at antennas 32 – 38 later than the direct radiations from the radio-frequency sources from influencing the source location presented on the indicator 54.

Also gate generator 66 provides a signal to "and" gate 71 which also receives a signal from device 49 which is utilized in the case of polarized signals, if the vehicle roll is not excessive, and from squelch circuit 69 if the predetermined maximum has not been exceeded. If all the signals to "and" gate 71 are present, oscillator 72 will be actuated to send signals to boxcar circuits 50 and 60 to limit the pulse lengths therein, and to indicator 54 to supply intensity power. Audio circuit 74 is used to determine the nature and repetition frequency of pulses to help in identifying the source signal.

By measuring the inputs to indicator 54 and comparing them with a reference set of measurements which correspond to a desired line of travel for the vehicle 26, an error signal, which is the difference between its measured inputs and the reference values, can be used to bring and maintain the vehicle on the desired line of travel.

Although this invention has been disclosed and illustrated with reference to particular applications, the principles involved are susceptible to numerous other applications, which will be apparent to persons skilled in the art. The invention is, therefore, to be limited only as indicated by the scope of the appended claims.

Having thus described our invention, we claim:

1. Apparatus for receiving signals comprising
   first locating means for locating a signal direction along one axis,
   second locating means for locating said signal direction along a second axis,
   said locating means each comprising receiving means connected to amplifying means,
   attenuating means to attenuate the signals to said amplifying means in proportion to the signals from said amplifying means thereby increasing the range of said amplifying means,
   display means for receiving said signals from said locating means and displaying the source corresponding to said signal,
   the received signal being pulsed,
   a leading edge gate generator means,
   said leading edge gate generator means being between each of said locating means and said display means for sending only the leading edge of the pulse to the display means, thereby minimizing the undesirable effects of reflections of the source of radiation from surrounding objects.

2. Apparatus of claim 1 with
   boxcar circuit means being between each leading edge gate generator means and the display means for utilizing the information contained in the leading edge of a pulse for a predetermined length of time.

3. Apparatus of claim 1 with
   said attenuating means comprising an attenuator being placed between each receiving means and its corresponding amplifying means,
   an amplitude selector means being connected to the outputs of said amplifying means,
   said amplitude selector means selecting the largest amplitude signal from said amplifying means,
   a power level switch means being connected between said amplitude selector and said attenuating means for actuating said attenuating means in accordance with the selected signal received from said amplitude selector means,
   squelch circuit means being connected to the output of said amplitude selector means for squelching the signal to said display means when any received signal exceeds a predetermined maximum.

4. Apparatus of claim 2 with
   an "and" circuit and a blocking oscillator means connected in series between each of said boxcar circuits and said display means,
   said blocking oscillator means limiting the pulse length from said boxcar circuits and supplying intensity power to said display means,
   said squelch circuit means being connected to said "and" circuit to send a squelch signal to said blocking oscillator means to block signals to said display means by cutting off said intensity power.

5. Apparatus of claim 4 having
   an audio signal producing means connected to said blocking oscillator means to convert the blocking oscillator means output pulses to sound energy.

6. Apparatus comprising
   first locating means for locating a signal direction along one axis,
   second locating means for locating said signal direction along a second axis,
   display means for receiving said signals from said locating means and displaying the source corresponding to said signal,
   a signal threshold means being connected between said locating means and said display means to eliminate signals to the display means when the sum of the signals from said locating means is below a predetermined minimum, thereby minimizing noise signals,
   the received signal being pulsed, leading edge gate generator means being between said locating means and said display means for sending only the leading edge of the pulse to the display means, thereby minimizing the undesirable effects of reflections of the signal source of radiation.

7. Apparatus comprising first locating means for locating a signal direction along one axis, second locating means for locating said signal direction along a second axis, display means for receiving said signals from said locating means and displaying the source corresponding to said signal, roll cutout means being between said locating means and said display means to eliminate signals to the display means when the signal from one locating means exceeds the signal from the other locating means by more than a predetermined maximum, the received signal being pulsed, leading edge gate generator means being between said locating means and said display means for sending only the leading edge of the pulse to the display means, thereby minimizing the undesirable effects of reflections of the main source of radiation from surrounding objects.

8. Apparatus comprising first locating means positioned on a vehicle for locating a signal direction along one axis, second locating means positioned on a vehicle for locating said signal direction along a second axis, display means for receiving said signals from said locating means and displaying the source corresponding to said signal, roll cutout means being between said locating means and said display means to eliminate signals to the display means when the roll of the vehicle exceeds a predetermined amount.

* * * * *